Jan. 9, 1951  C. C. WETZEL ET AL  2,537,198
HARVESTING MACHINE FOR POTATO DIGGERS AND THE LIKE
Filed March 1, 1948  2 Sheets-Sheet 1
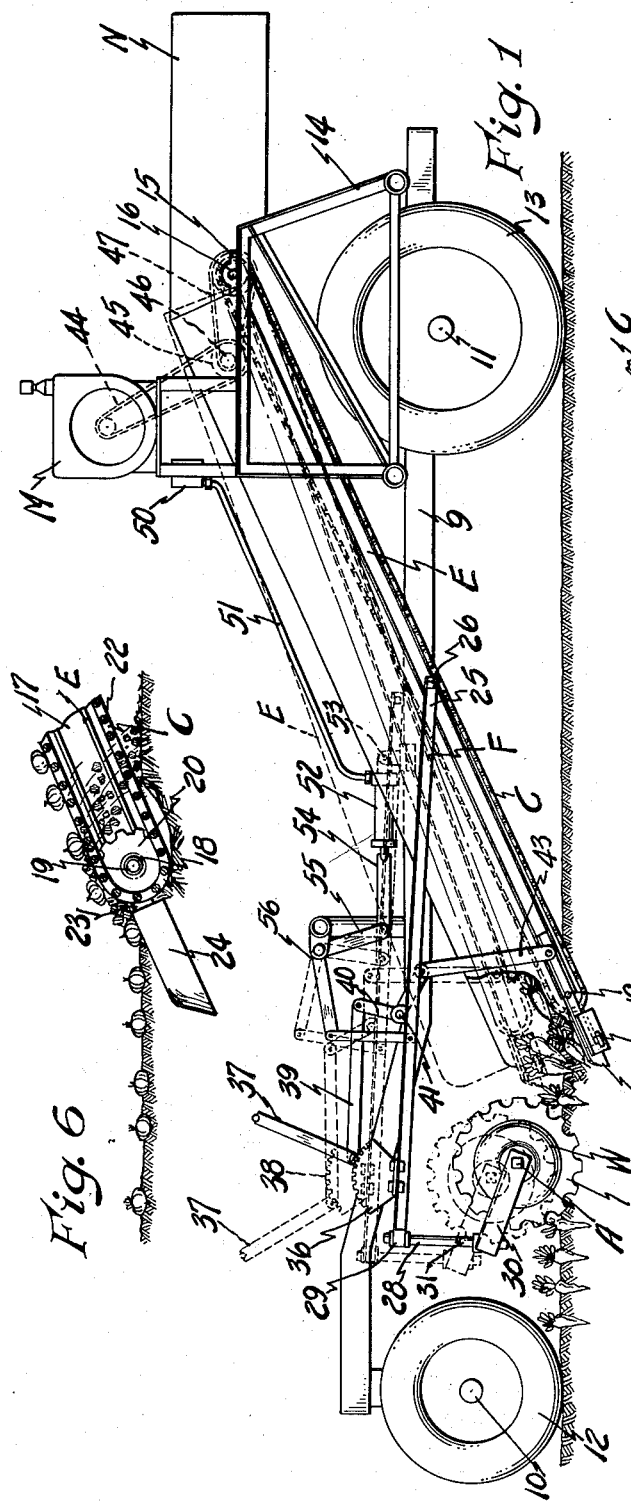
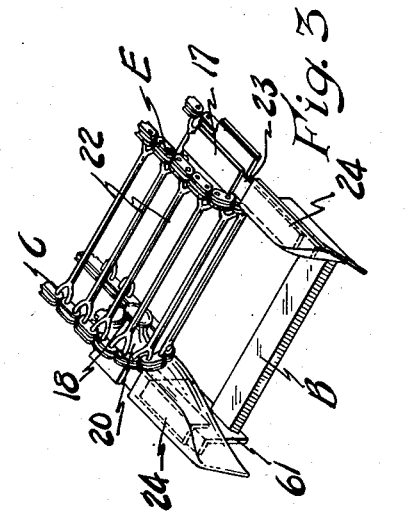
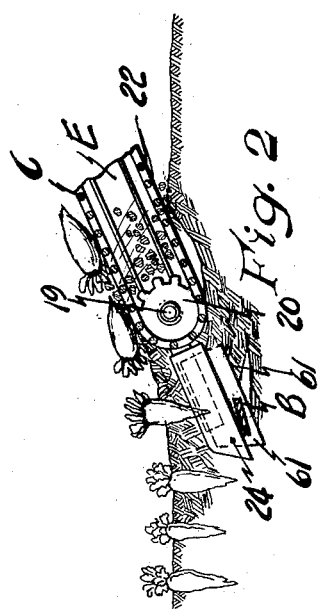
INVENTOR.
Clifford C. Wetzel.
Leon F. Dilts
By Frank C. Searman.
ATTORNEY

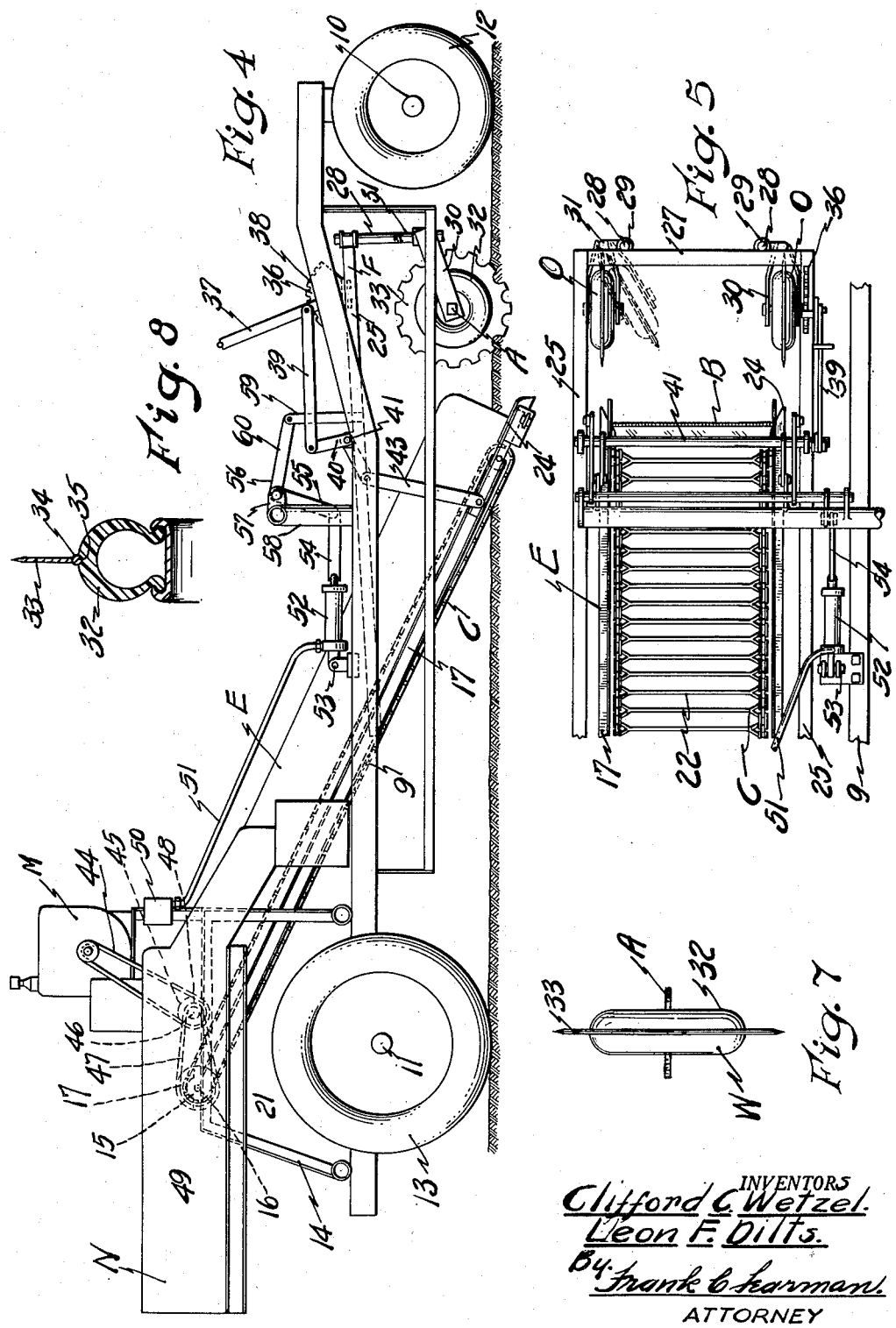

Patented Jan. 9, 1951

2,537,198

UNITED STATES PATENT OFFICE 2,537,198

HARVESTING MACHINE FOR POTATO DIGGERS AND THE LIKE

Clifford C. Wetzel and Leon F. Dilts, Ithaca, Mich.

Application March 1, 1948, Serial No. 12,364

7 Claims. (Cl. 55—51)

This invention relates to harvesters for harvesting potatoes, onions, beets, carrots, turnips, chicory and bulbs and vegetables of a similar nature.

One of the prime objects of the invention is to design a harvester in which the lower end of the elevating chain forms the digging means and which when set, will at all times, in either smooth or uneven soil, maintain an even, uniform digging depth.

Another object is to design a harvester in which the digger end of the elevator floats as the machine is operated, providing for uniform digging, and elevation of the product with a minimum of accompanying dirt.

A further object is to provide a very simple, practical, and economical harvester which can be operated in muck, sand, sandy loam, and either dry or wet soil, and which crowds the bulbs and/or vegetables from the ground and into the elevator as the machine travels, the chain being agitated to remove all dirt and sift it through the elevator chain at its lower end.

Still a further object is to provide a digging means, the upward lifting motion of which when combined with the machine's travel, rolls the bulbs and roots out of the soil before the digger chain comes into contact therewith, the dirt forming a cushion for and eliminating injury to the product.

A further object is to design a harvester that harvests crops in the ground as well as crops that have already been pulled and lie on top of the ground.

Still a further object is to provide a harvester provided with a detachable blade means located ahead of the digging means for cutting tap roots, destroying weeds, and raising and agitating the soil so that the elevator chain readily carries the product upwardly as the machine is operated.

Another object is to provide a very simple, practical coulter means associated with the elevator for cutting through vines and other debris lying on the ground in the path of travel of the machine, thus defining the strip of soil in which the digger chain operates and further freeing the side margins of the strip of soil of any entangling vines, etc. which might catch and clog the elevator side frame or digging chain.

A further object is to provide means for crowding the harvested product onto the elevating chain and assisting in the breaking up of the soil as the machine is operated.

With the above and other objects in view, the present invention consists in the combination and arrangement of parts, hereinafter more fully described, illustrated in the accompanying drawings, and more particularly pointed out in the appended claims, it being understood that changes may be made in the form, size, proportion, and minor details of construction, without departing from the spirit, or sacrificing any of the advantages of the invention.

In the drawings:

Fig. 1 is a fragmentary, side-elevational view of our harvester showing it harvesting red beets, the broken lines showing the elevating means, coulter and levers in raised positions.

Fig. 2 is an enlarged, sectional, fragmentary, side-elevational view including a blade used in connection with deep-rooted vegetables.

Fig. 3 is an isometric view of the mechanism shown in Fig. 2.

Fig. 4 is a longitudinal, sectional view similar to Fig. 1 and showing the opposite side of the elevator.

Fig. 5 is a fragmentary, plan view of the digging end of the elevator etc., the broken lines showing one of the coulters swung.

Fig. 6 is a view similar to Fig. 2 showing the machine harvesting onions.

Fig. 7 is a part-sectional, edge-elevational view of one of the coulter members.

Fig. 8 is a fragmentary, transverse-sectional view through one of the coulter wheels.

Referring now more specifically to the drawings in which we have shown the preferred embodiment of our invention. The device comprises a main frame 9 which is provided with front and rear axles 10 and 11 respectively, and on which ground-engaging wheels 12 and 13 are journaled as usual, and inasmuch as the instant invention is directed to the digger, coulter, and elevating means and associated parts, we do not deem it necessary to show the complete machine.

Fabricated frame sections 14 are mounted on the main frame 9 and include bearings 15 in which the upper shaft 16 of an inclined elevator E is pivotally mounted.

The elevator E comprises side frames 17 having bearings 18 at the lower end thereof in which stub shafts 19 are journaled, and on which sprockets 20 are mounted as usual, similar sprockets 21 being provided on the upper shaft 16, and a chain C is trained thereover, said chain comprising spaced-apart bars 22 which form both the digging and elevating means.

An extension 23 is secured to each of the side frames 17, and wedge-shaped crowding shoes 24 are secured thereto in any desired manner, the front end of each shoe being pointed as shown so that they readily lead into the soil.

A U-shaped frame F extends forwardly of the elevating mechanism, the legs 25 being pivotally attached to the side frames 17 at the points 26, and the front ends are connected by cross member 27. Offset coulter assemblies O are connected to the cross member 27 as shown, each assembly comprising an offset, vertical shaft 28 which is mounted in a bearing 29, and side bars 30 are connected to the offset sections 31 of the shaft 28, the opposite ends being connected to the axle A of a pneumatic wheel assembly W, said assembly including a pneumatic tire 32 having a preferably scalloped fin 33 mounted thereon.

The fin 33 has a rounded wire 34 welded or otherwise secured to the inner circumference thereof, and the tire 32 is slightly grooved as at 35 so that the rounded edge 34 rests therein, so that when the tire is inflated, the fin is tightly held in position. This fin 33 can have either a scalloped or plain cutting edge, and in practice, the fin cleaves the soil with the tire riding on the surface of the ground and gauging the depth of travel, and the fact that the fin is of larger diameter than the tire provides a shearing action for the fin so that it readily shears roots and vines.

The frame F is held raised by means of a quadrant 36 mounted thereon, a lever 37 being associated therewith and being releasably engaged with the toothed section 38 of said quadrant. A link 39 connects the lever 37 with a crank 40 provided on the transversely disposed shaft 41. Additional cranks 42 are rigid on the shaft 41, and links 43 connect said cranks to the side walls of the elevator.

The digger and elevator chain is driven from the motor M which is mounted on the fabricated frame 14, a drive belt 44 being geared to said motor and to a gear 45 provided on a jack shaft 46, and a chain 47 drivingly connects sprockets 48 and 49 on the jack shaft and the elevator shaft 16 respectively.

The digger chain and elevator assembly float when in operating position, the mechanism, due to the weight, being hydraulically raised, a pump 50 being connected to the motor M, and a line 51 connects said pump with a cylinder 52, said cylinder being pivotally connected to a bracket 53 provided on the main frame.

A piston (not shown) is reciprocatingly mounted in the cylinder 52, and one end of a piston rod 54 is connected thereto, the opposite end being connected to the leg 55 of a bell crank lever 56 which is connected to the crank 57 of the support member 58. A link 59 is connected to the leg 60 of the bell crank 56 and to the frame F, so that the frame may be raised when desired, or be free to float in the ground when the machine is harvesting.

When the machine is moved to the field for operation, the operator first actuates the lever 37 to lower the frame F so that the fin 33 of the coulter assemblies O engages and enters the ground, with the tires 32 riding on the surface. As the machine moves ahead, the coulter rims 33 slide into the ground and define a strip of land in which the rows of vegetables or bulbs are planted, and the sharp ends of the crowding members 24 lead into the ground to proper depth, the forward travel of the machine, coupled with the lifting or forward and upward travel of the digging chain against the strip of soil, loosens the ground and rolls the bulbs or vegetables out of the soil before the chain bars come into direct contact with the product, the ground acting as a cushion between the chain bars and the roots, and the spacing of the bars, etc., insures that a relatively small volume of dirt is carried upwardly onto the chain with the product, thus conserving power and insuring ease of operation.

For harvesting carrots, beets, chicory, parsnips, potatoes or other vegetables, a blade attachment is provided, and includes a horizontally disposed blade B mounted in angularly disposed members 61 which are secured to the crowding shoes 24 by means of bolts or the like (not shown).

The blade is disposed ahead and below the lower edge of the crowding members, so that it cuts any tap roots or weeds, and the crowding action of the digger plus the forward travel of the harvester, forces the product onto the chain which can be agitated to shake the dirt through, and as clearly shown in Figs. 2 and 6 of the drawings, the product thence being discharged into a cross conveyor N and thence to spouts or topper means (not shown), and we wish to direct attention to the fact that the blade does not force or raise lumps to the surface of the ground, any flaked soil or lumps settle back at the same level so that no lumps are created to clog the elevator chain.

We wish to direct particular attention to the fact that the depth of travel of the digger chain is only about one-half the depth of the blade cut and the vegetable, because the soil and product are raised by the blade, the soil is loosened and drops back, and the forward travel of the machine together with the upward travel of the elevator chain carries the product upwardly and the dirt sifts through the chain at the lower end of the elevator. The device is simple, practical, and economical to operate, and is useable in soil of all kinds.

From the foregoing description, it will be obvious that we have perfected a very simple, practical and substantial bulb and vegetable harvester of the class described.

What we claim is:

1. A machine of the class described, comprising a frame, an inclined elevator pivotally connected at its upper end to said frame, a combination digging and elevating chain forming a part of said conveyor, and shoes on the opposite sides of the chain, a transversely disposed knife bridging said shoes, said knife and shoes leading the lower end of the elevator chain into the ground a predetermined depth for crowding the soil and product upwardly and onto the chain as the machine moves ahead.

2. In a machine of the class described comprising, a main frame, an inclined elevator pivotally connected at its upper end to said frame, crowding shoes on the opposite sides of the lower end of the elevator and forming an extension thereof for leading into the ground, a transversely disposed knife bridging said shoes, a driven combination elevating and digging chain on said elevator in the rear of the shoes, said chain comprising spaced-apart transversely disposed bars adapted to crowd into the soil to a predetermined depth to loosen the soil and product so that it is crowded onto the chain as the machine travels.

3. The combination as defined in claim 2 in which transversely spaced coulters are provided directly ahead of the elevator to cut into the soil and define a strip of ground to be worked by the combination digging and elevating chain.

4. In a machine of the class described comprising a main frame, an inclined elevator pivotally connected at its upper end to said main frame, and including a combination digging and elevator chain, crowding shoes connected to and forming an extension to the lower end of the elevator frame and adapted to lead the lower end of the digger chain into the ground to a predetermined depth, said chain comprising spaced-apart, transversely disposed bars, an auxiliary frame, coulters on said frame ahead of the elevator and defining a strip of ground in which the digger chain operates, and a transversely disposed blade spanning said shoes for loosening the product and soil as the machine is operated.

5. The combination set forth in claim 4 in which a hydraulically actuated means is provided for raising the lower end of the elevator.

6. The combination set forth in claim 4 in which the blade is spaced below the lower edge of the shoes and is quickly detachable therefrom.

7. In a machine of the class described, a main frame, an inclined elevator pivotally connected at its upper end to said frame, an auxiliary frame adjacent to and supported by the main frame with its one end connected to said elevator at a point intermediate its length, crowding shoes on and forming an extension of the lower end of said elevator and adapted to lead into the ground, and a driven chain forming a part of the elevator and comprising a plurality of spaced-apart bars leading into the ground in the rear of said shoes for crowding the product out the ground and onto the elevator chain as the machine is operated, a transversely disposed blade spanning said shoes for loosening the product and soil as the machine is operated, and trailing colter assembly on the auxiliary frame ahead of the elevator and defining a strip of ground in which the digger chain operates.

CLIFFORD C. WETZEL.
LEON F. DILTS.

REFERENCES CITED

The following references are of record in the file of this patent:

UNITED STATES PATENTS

| Number | Name | Date |
|---|---|---|
| 1,761,286 | Zuckerman | June 3, 1930 |
| 2,061,395 | Daniels | Nov. 17, 1936 |
| 2,358,400 | Kiest | Sept. 19, 1944 |
| 2,452,418 | Zuckerman | Oct. 26, 1948 |

FOREIGN PATENTS

| Number | Country | Date |
|---|---|---|
| 121,889 | Australia | Aug. 15, 1946 |